US007608799B2

(12) United States Patent
Mikata et al.

(10) Patent No.: US 7,608,799 B2
(45) Date of Patent: Oct. 27, 2009

(54) SOLID-STATE LASER PROCESSING APPARATUS AND LASER WELDING PROCESS

(75) Inventors: Hironari Mikata, Toyota (JP); Kazuhisa Mikame, Nagoya (JP); Akio Sato, Toyota (JP); Kazuki Kuba, Tokyo (JP); Shuichi Fujikawa, Tokyo (JP); Toshiaki Watanabe, Tokyo (JP)

(73) Assignees: Toyota Jidosha Kabushiki Kaisha, Toyota-shi, Aichi-ken (JP); Mitsubishi Denki Kabushiki Kaisha, Tokyo (JP)

( * ) Notice: Subject to any disclaimer, the term of this patent is extended or adjusted under 35 U.S.C. 154(b) by 187 days.

(21) Appl. No.: 11/001,052

(22) Filed: Dec. 2, 2004

(65) Prior Publication Data

US 2005/0121427 A1 Jun. 9, 2005

(30) Foreign Application Priority Data

Dec. 5, 2003 (JP) ............................. 2003-408009

(51) Int. Cl.
*B23K 26/00* (2006.01)
(52) U.S. Cl. ............................ 219/121.64; 219/121.63; 219/121.85
(58) Field of Classification Search ............ 219/121.64, 219/121.63, 121.85, 121.75, 121.73
See application file for complete search history.

(56) References Cited

U.S. PATENT DOCUMENTS

| | | | | |
|---|---|---|---|---|
| 5,052,017 A * | 9/1991 | Hobart et al. | ................... | 372/99 |
| 5,595,670 A | 1/1997 | Mombo-Caristan | | |
| 5,815,626 A * | 9/1998 | Kuba et al. | ................... | 385/124 |
| 6,451,010 B1 * | 9/2002 | Angeley | ....................... | 606/17 |
| 6,554,824 B2 * | 4/2003 | Davenport et al. | ............. | 606/3 |
| 6,713,713 B1 * | 3/2004 | Caldwell et al. | ........ | 219/121.63 |
| 6,778,565 B2 * | 8/2004 | Spuehler et al. | ................ | 372/25 |
| 6,788,723 B1 * | 9/2004 | Langhans et al. | .............. | 372/66 |
| 7,054,341 B2 * | 5/2006 | Hermann et al. | ............... | 372/26 |
| 2003/0058542 A1 | 3/2003 | Akiyama et al. | | |
| 2006/0207977 A1 * | 9/2006 | Hermann et al. | ........ | 219/121.69 |

FOREIGN PATENT DOCUMENTS

EP 0 339 868 11/1989
EP 1 323 491 A2 7/2003

(Continued)

OTHER PUBLICATIONS

European Search Report dated Apr. 6, 2005.

(Continued)

*Primary Examiner*—M. Alexandra Elve
(74) *Attorney, Agent, or Firm*—Finnegan, Henderson, Farabow, Garrett & Dunner, LLP (57) ABSTRACT

A solid-state laser processing apparatus includes a solid-state laser oscillator, a laser beam diameter controller, an optical fiber, and a processing head. The solid-state laser oscillator oscillates a laser beam. The laser beam diameter controller controls a beam diameter of the laser beam, and includes an aperture. The aperture controls a beam quality of the laser beam defined by $M^2$ so as to fall in a range of $85 \leq M^2 \leq 105$. The optical fiber guides the controlled laser beam therein. The processing head includes a transfer optical system, and irradiates the guided laser beam to a surface of a workpiece to be processed by way of the transfer optical system.

4 Claims, 4 Drawing Sheets

FOREIGN PATENT DOCUMENTS

| | | |
|---|---|---|
| JP | 55-086694 | 6/1980 |
| JP | 58-043419 | 3/1983 |
| JP | 2000-263267 | 9/2000 |
| JP | 2002-283085 | 10/2002 |
| JP | 2003-209307 | 7/2003 |
| WO | WO 03/071639 A1 | 8/2003 |

OTHER PUBLICATIONS

Derwent Patent Abstract XP-002321358, KR 2003-069236.
Laser and laser-related equipment—Test methods for laser beam parameters—Beam widths, divergence angle and beam propagation factor, *International Standard* ISO 11146 (Jun. 1, 1999).
Japanese Office Action dated Jun. 24, 2008.

* cited by examiner

SOLID-STATE LASER PROCESSING APPARATUS AND LASER WELDING PROCESS

BACKGROUND OF THE INVENTION

1. Field of the Invention

The present invention relates to a solid-state laser processing apparatus. Moreover, it relates to a laser welding process for welding overlapped steel plates, laser welding process in which the solid-state laser processing apparatus is used.

2. Description of the Related Art

Laser beams differ from ordinary light in that they exhibit extremely small diverging angles. Accordingly, laser beams can be focused to small spot diameters, and can thereby produce high energy densities. Consequently, laser beams have been utilized in various fields, such as micro-fabrication for boring printed circuit boards and welding for steel plates.

However, depending on the applications, there might arise drawbacks, because laser beams do not exhibit a uniform intensity distribution curve. Accordingly, many proposals have been made in order to improve beam qualities, for instance, as disclosed in Japanese Unexamined Patent Publication (KOKAI) No. 2002-283,085.

In conventional welding techniques using laser, special lenses, such as commercially available lens assemblies and aspherical lenses, have been used in order to make laser beams free from the influence of spherical aberration to produce beam qualities exhibiting a uniform intensity distribution curve. However, these lenses are very expensive. Moreover, the lenses require long manufacturing lead times, because they are manufactured via special manufacturing processes. Consequently, the lenses suffer from a problem in that they are less likely to be used in production lines.

In addition, in laser welding using high-quality laser beams, laser beams exhibit uniform intensity distribution curves, but the profiles show steep gradients at the edges or peripheries. Accordingly, when spaces are present between steel plates in welding overlapped steel plates, for example, the steel plates might be fused off. Consequently, fused drops might occur at the welds between the steel plates.

SUMMARY OF THE INVENTION

The present invention has been developed in view of the aforementioned problems. It is therefore an object of the present invention to provide a solid-state laser processing apparatus which can produce laser beams exhibiting gentle intensity distribution curves less expensively. It is a further object of the present invention to provide a laser welding process for overlapped steel plates in which the solid-state laser processing apparatus is used.

The inventors of the present invention found out that it is possible to achieve the aforementioned objects when combining an extremely simple transfer optical system even with laser beams whose beam qualities are so poor that they have been said to be unusable. As a result of wholehearted studies, the inventors completed the present invention.

A solid-state laser processing apparatus according to the present invention comprises:

a solid-state laser oscillator for oscillating a laser beam;

means for controlling a beam diameter of the laser beam, the means comprising an aperture for controlling a beam quality of the laser beam defined by $M^2$ so as to fall in a range of $85 \leq M^2 \leq 105$; and an optical fiber for guiding the controlled laser beam therein; and a processing head comprising a transfer optical system, and irradiating the guided laser beam to a surface of a workpiece to be processed by way of the transfer optical system.

Moreover, in the present solid-state laser processing apparatus, the transfer optical system can desirably comprise two spherical lenses.

A laser welding process according to the present invention uses a solid-state laser processing apparatus comprising:

a solid-state laser oscillator for oscillating a laser beam;

means for controlling a beam diameter of the laser beam, the means comprising an aperture for controlling a beam quality of the laser beam defined by $M^2$ so as to fall in a range of $85 \leq M^2 105$; and an optical fiber for guiding the controlled laser beam therein; and a processing head comprising a transfer optical system, and irradiating the guided laser beam to a surface of a workpiece to be processed by way of the transfer optical system; and the laser welding process comprises a step of controlling an intensity distribution curve of the laser beam irradiating the surface of the workpiece to a bell-shaped profile which is high around the center of a focal point of the laser beam and slopes gradually from high to low toward the periphery.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims.

A solid-state laser processing apparatus according to the present invention, especially, its embodiment modes will be hereinafter described with reference to FIGS. 1 through 5.

Figure 1:
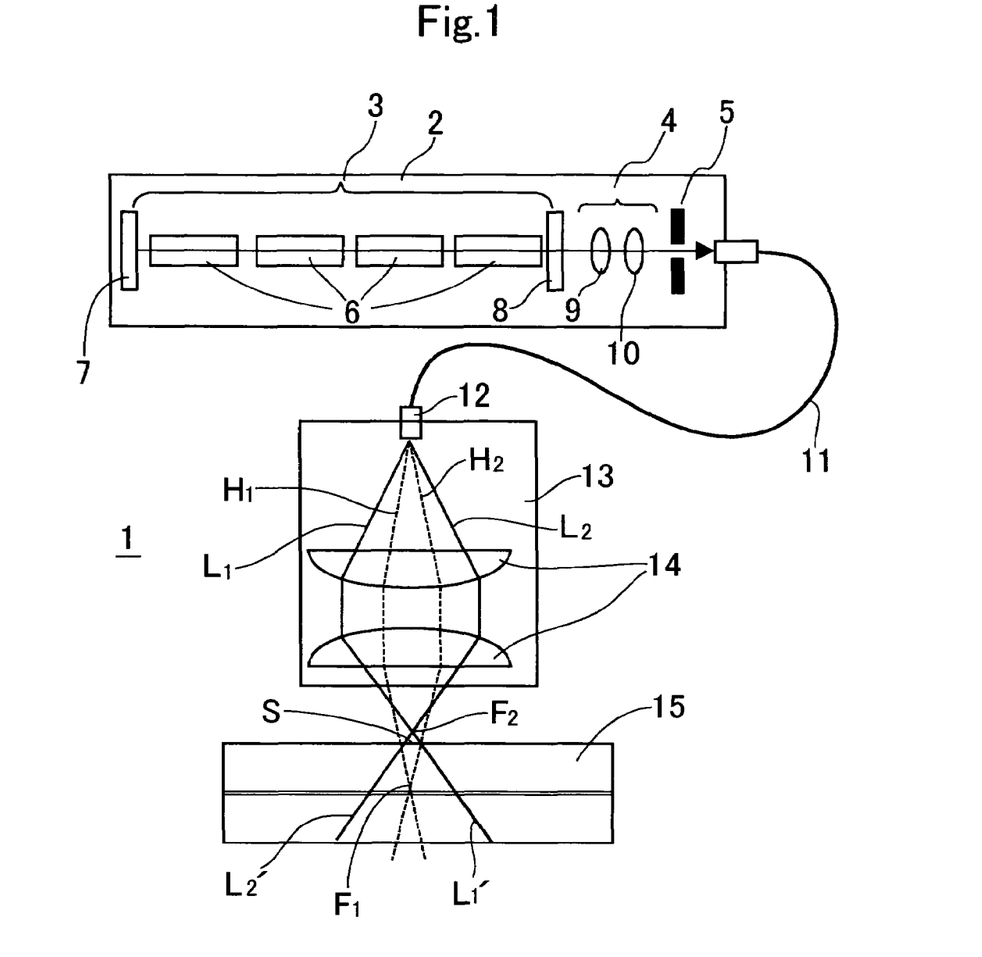
FIG. 1 is a schematic diagram for illustrating an arrangement of a solid-state laser processing apparatus according to the present invention.

FIG. 1 roughly illustrates a solid-state laser processing apparatus according to a preferred embodiment of the present invention. The solid-state laser processing apparatus 1 comprises a solid-state laser oscillator 2, an optical fiber 11, and a processing head 12 with a built-in transfer optical system 13.

The solid-state laser oscillator 2 comprises a laser resonator 3, a coupled optical system 4, and an aperture 5. The laser resonator 3 comprises laser media 6, a total reflection mirror 7, and a partial reflection mirror 8. The laser media 6 serve as an exciter. The exciter (i.e., the laser media 6) is interposed between the total reflection mirror 7 and the partial reflection mirror 8. The aperture 5 controls the diameter of laser beams.

As for the laser media 6, it is desirable to use solid rod-shaped media composed of Nd:YAG (i.e., YAG with Nd doped). In particular, when welding overlapped steel plates, it is desirable to enlarge the solid rod-shaped media so as to enhance the output per a rod and reduce the number of rods, thereby letting the resulting exciters output higher powers. When the laser media are enlarged so as to let them output higher powers, laser beams emitted through the partial reflection mirror 8 become low-quality laser beams which diverge greatly. However, when letting the laser beam components with great diverging pass the coupled optical system 4 and controlling them with the aperture 5, it is possible to turn them into laser beams whose beam qualities are appropriate for welding steel plates.

The coupled optical system 4 lets laser beams emitted from the laser oscillator 3 go into the optical fiber 11 for transmission and condensation. The coupled optical system 4 comprises a relay lens 9, and a condensing lens 10.

The aperture 5 controls the beam quality of laser beams. Specifically, the aperture diameter of the aperture 5 is controlled so that the divergence of laser beams emitted from the laser oscillator 3 is controlled.

For example, in the present solid-laser processing apparatus 1, the aperture 5 can control the beam quality $M^2$ of laser beams emitted from the laser oscillator 3 so as to fall in a range of $85 \leq M^2 \leq 105$. When the laser beam quality $M^2$ is lower than 85, it is not preferable because the intensity distribution curve of laser beams is so sharp at the edges or peripheries that defects, such as fused-off steel plates and fused drops, occur if spaces are present between steel plates. On the other hand, when the laser beam quality $M^2$ is higher than 105, it is not adequate because the focused diameter of laser beams is diverged so much that fusion penetration might be insufficient.

Note that the beam quality $M^2$ is defined in the following ISO standard, and is an invariant which specifies the relationship between the focused diameter and divergence angle of non-Gaussian beam and those of Gaussian beam when laser beams transmit through an optical system.

ISO11146: 1999(E) Laser and laser-related equipment—
Test Methods for laser beam parameters—Beam widths, divergence angle and beam propagation factor 3.6

The smaller the beam quality $M^2$ is the less likely laser beams are to diverge. Accordingly, it is possible to say such laser beams are high-quality laser beams that produce smaller spot diameters. In general, in operations for cutting steel plates using $CO_2$ laser beams, it has been said that the beam quality $M^2$ can desirably be less than 10. Moreover, in operations for welding steel plates, YAG lasers whose beam quality $M^2$ is less than 75 have been used often.

Relationships among an incident angle, an emission angle, the beam quality $M^2$ and N.A. (i.e., numerical aperture) will be hereinafter described in detail.

Figure 8:
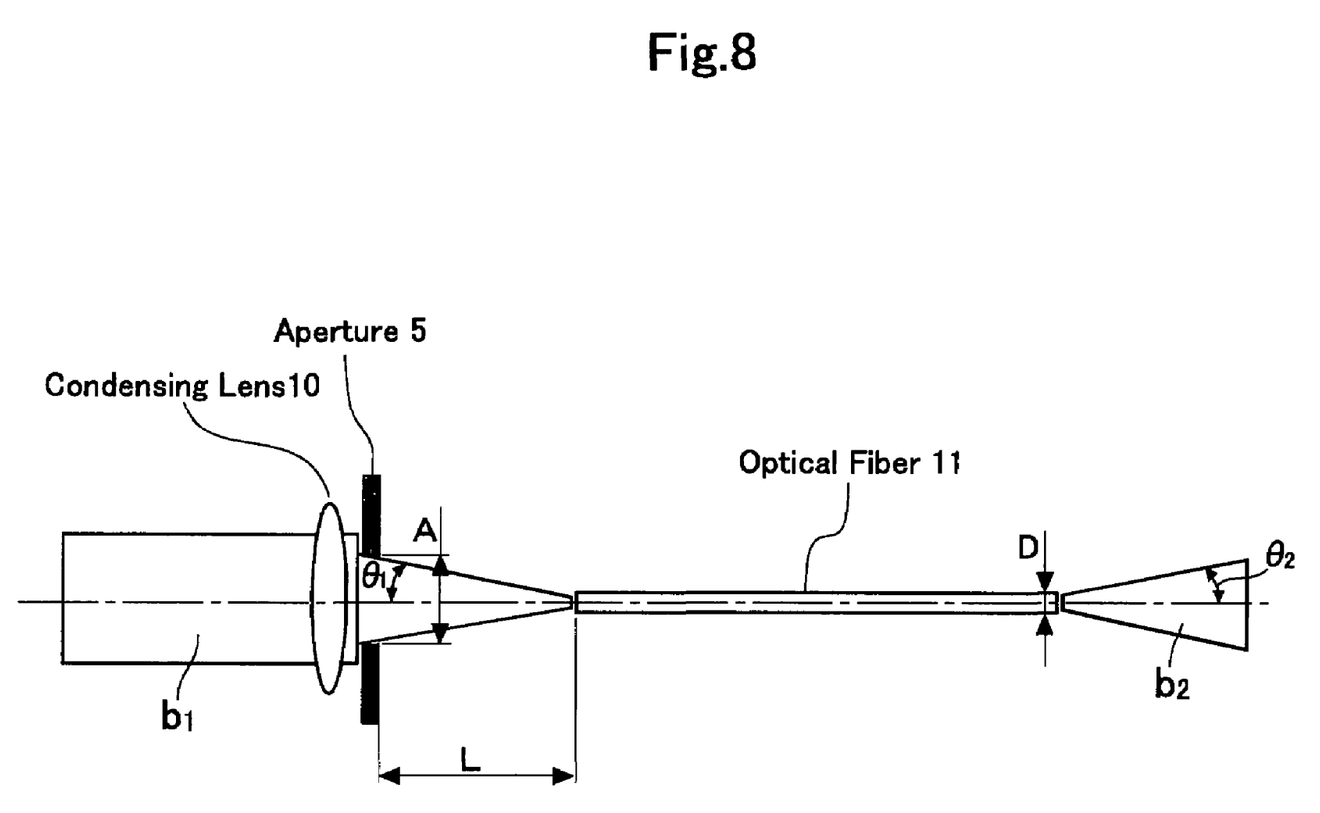
FIG. 8 is an explanatory diagram for illustrating relationships among an incident angle, an emission angle, $M^2$ and N.A. (i.e., numerical aperture).

As illustrated in FIG. 8, a laser beam $b_1$, emitted from the laser oscillator 3, is condensed at the condensing lens 10. The condensed laser beam $b_1$ then passes the opening of the aperture 5, and enters the optical fiber 11. After transmitting through the optical fiber 11, the laser beam $b_1$ is emitted as a laser beam $b_2$.

The incident angle $\theta_1$ of the laser beam $b_1$ is conserved, because laser beams transmit in equi-diameter optical fibers by means of internal total reflection. Therefore, the emission angle $\theta_2$ is substantially equal to the incident angle $\theta_1$ as set forth in equation (1) below.

$$\theta_1 \approx \theta_2 \qquad (1)$$

Let the diameter of optical fiber be D, and the wavelength of laser beam be $\lambda$, equation (2) below gives the beam quality $M^2$.

$$M^2 = \pi \times D \times (\theta_2/1.5)/(2 \times \lambda) \qquad (2)$$

In equation (2), $\theta_2$ is divided by a factor of 1.5 in order to let the secondary moment diameter, used as the definition of laser beam diameter in the determination of the beam quality $M^2$, conform to the emission angle $\theta_2$ defined by the beam outermost angle. For example, let the wavelength $\lambda$ of the laser beam $b_1$ be 1.06 μm, and the diameter D of the optical fiber 11 be 0.6 mm, the beam quality, $85 \leq M^2 = 105$, is equivalent to 0.143 radian $\leq \theta_2 \leq$ 0.177 radian. Therefore, in order to produce the beam quality, $85 \leq M^2 = 105$, the opening diameter A of the aperture 5 and the distance L from the aperture 5 to the optical fiber 11 can be set so that 0, be 0.143 radian $\leq \theta_1 \leq$ 0.177 radian, because $\theta_1$ and $\theta_2$ satisfy equation (1) above.

The incident angle $\theta_1$ of the laser beam $b_1$, the opening diameter A of the aperture 5, and the distance L from the aperture 5 to the optical fiber 11 can be determined by equation (3) below.

$$\theta_1 = \tan^{-1}(A/2L) \approx A/2L \qquad (3)$$

Note that N.A. (i.e., numerical aperture) can be determined by equation (4) below.

$$N.A. = \sin\theta_1 \approx \sin\theta_2 \approx A/2L \qquad (4)$$

As illustrated in FIG. 1, the processing head 12 comprises the built-in transfer optical system 13. The transfer optical system 13 comprises two plane-convex lenses 14, 14 which are disposed so that the spherical sides face to each other. Thus, the transfer optical system 13 can focus incident laser beams and then transfer them onto a surface of workpieces to be processed.

The present laser welding process employs the above-described solid-state laser processing apparatus. Specifically, the present laser welding process comprises a step of controlling an intensity distribution curve of the laser beam irradiating the surface of the workpiece to a bell-shaped profile which is high around the center of a focal point of the laser beam and slopes gradually from high to low toward the periphery.

In accordance with the present laser welding process, it is possible to produce a good quality when welding overlapped steel plates, because the laser beam, which irradiates the workpiece, exhibits an intensity distribution curve having a bell-shaped profile.

The principle how laser beams exhibiting laser intensity distribution curves with appropriate profiles for welding can be produced will be hereinafter described with reference to FIG. 1 while focusing on the operations of the transfer optical system 13. In the drawing, the transfer optical system 13 is illustrated in an enlarged manner.

Figure 2:
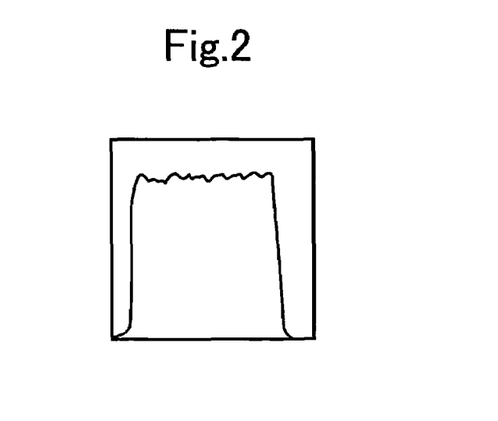
FIG. 2 is a diagram for illustrating a top hat-shaped profile regarding an intensity distribution curve of a high beam quality.

In the present solid-state laser processing apparatus 1, a laser beam emitted from the solid-state laser oscillator 2 first enters the coupled optical system 4, and then enters the aperture 5 so that the diverging components are controlled thereat. Then, the laser beam enters the optical fiber 11, and transmits therein. The intensity distribution curve of the laser beam is turned into a rectangular shape at the fiber output end 12 of the optical fiber 11 as illustrated in FIG. 2. Thus, the laser beam exhibiting the rectangular intensity distribution curve enters the transfer optical system 13.

The laser beam emitted from the fiber output end 12 includes the diverging beam components abundantly, because the beam quality is controlled in a range of $85 \leq M^2 \leq 105$ at the aperture 5. Therefore, at the transfer optical system 13 comprising the coupled two plane-convex lenses 14, 14, the high-quality components of the laser beam whose $M^2$ is less than 75 (i.e., $M^2<75$) approximately transmit through the central areas of the plane-convex lenses 14, 14 enclosed by the dashed lines $H_1$, $H_2$, and focus at a focal point $F_1$. On the other hand, the low-quality components of the laser beam whose $M^2$ is more than 75 (i.e., $M^2>75$) approximately diverge. In particular, the lowest-quality beam components of the laser beam diverge as designated by the solid lines $L_1$, $L_2$, and focus at a focal point $F_2$ by the spherical aberration of the plane-convex lenses 14, 14.

Specifically, the beam components of the laser beam emitted from the optical fiber 11 simultaneously focus between $F_1$ and $F_2$ by the spherical aberration of the plane-convex lenses 14, 14 while shifting the focal points. The low-quality beam components transmitting along the solid lines $L_1$, $L_2$ focus at the focal point $F_2$, and thereafter diverge as designated by the solid lines $L_1'$, $L_2'$. Accordingly, a beam spot S coincides with the most constricted portion of the laser beam (i.e., laser beam waist). Note that the beam spot S is formed at the intersections of the high-quality beam components transmitting along the dashed lines $H_1$, $H_2$ and the low-quality beam components transmitting along the solid lines $L_1$, $L_2$. Consequently, it is possible to produce beam spots appropriate for laser welding.

Figure 3:
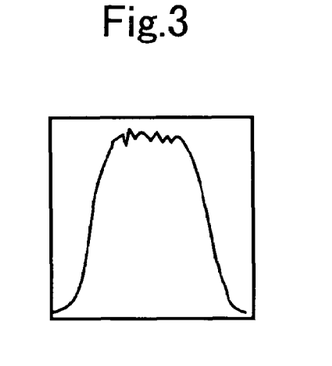
FIG. 3 is a diagram for illustrating a profile regarding an intensity distribution curve of a low beam quality according to the present invention, intensity distribution curve which involves aberration.
Figure 4:
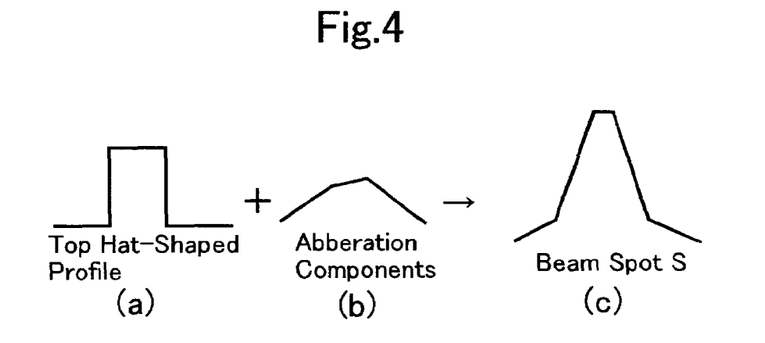
FIG. 4 is a conceptual diagram for illustrating a mechanism how the profile illustrated in FIG. 3 is formed.

As illustrated in FIG. 3, the intensity distribution curve of the laser beam at the beam spot S is turned into a bell-shaped profile in which the intensity is high around the center of the focal point of the laser beam and slopes gradually from high to low toward the periphery. That is, as designated at (a) of FIG. 4, the beam components of the laser beam transmitting through the central areas of the plane-convex lenses 14, 14, which are enclosed by the dashed lines $H_1$, $H_2$, and transferring onto the workpiece exhibit a top hat-profiled intensity distribution curve, because they have high qualities. On the other hand, the diverging beam components with low beam qualities are affected strongly by the spherical aberration of the plane-convex lenses 14, 14. Accordingly, the diverging intensity distribution curve affected by the spherical aberration of the plane-convex lenses 14, 14, designated at (b) of FIG. 4, is added to the top hat-profiled intensity distribution curve. Consequently, it is believed possible to produce bell-profiled intensity distribution curves, such as the intensity distribution curve exhibited by the beam spot S designated at (c) of FIG. 4.

When carrying out laser welding with laser beams whose beam spots exhibit bell-profiled intensity distribution curves being high around the center of the focal point of laser beams and sloping gradually from high to low toward the periphery according to the present invention, the beam spot S exhibits a high energy intensity at the center so that the beam spot S penetrates steel plates to form a key hole. On the other hand, the beam spot S exhibits a lower energy intensity at the periphery than that at the center, the beam spot S accordingly carries out gentle laser welding at the periphery, and thereby steel plates are preheated without being fused or even without being fused off. Consequently, it is possible to inhibit such drawbacks, steel plates have been fused off, or fused droplets have generated, from taking place. Thus, it is possible to expand the permissibility for the fluctuation of spaces between overlapped steel plates in laser welding.

Figure 5:
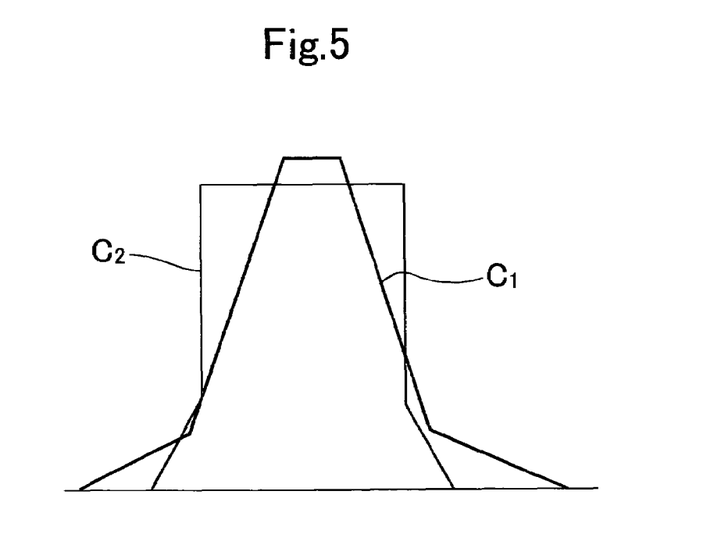
FIG. 5 is a conceptual diagram for illustrating a top hat-shaped profile and a bell-shaped profile involving aberration components, profiles which result from an identical laser-beam incident energy, in a superimposed manner.

Moreover, when the overall incident energy of a laser beam exhibiting a bell-profiled intensity distribution curve is equal to that of another laser beam exhibiting a top hat-profiled intensity distribution curve as schematically illustrated in FIG. 5, a laser beam exhibiting a bell-profiled intensity distribution curve $C_1$ is likely to penetrate to the bottom side of steel plates, because the bell-profiled intensity distribution curve $C_1$ has a wider base and simultaneously a higher peak than those of a top hat-profiled intensity distribution curve $C_2$. Therefore, even when the laser output is lowered, it is believed possible for laser beams exhibiting bell-profiled intensity distribution curves to effect advantages in welding similarly to those effected by laser beams exhibiting top hat-profiled intensity distribution curves.

Note that in the above-described preferred embodiment mode of the present invention, the transfer optical system 13 comprises a combination of two plane-convex lenses 14, 14. This is because, when only two lenses constitute the transfer optical system 13 built into the processing head 12, such a simple construction is highly reliable in manufacturing lines. Moreover, the plane-convex lenses 14, 14 are readily available and beneficial in view of cost, because they can be lenses used commonly. Thus, the transfer optical system 3 is not limited to the combination of the two plane-convex lenses 14, 14. Therefore, as for the constituent parts of the transfer optical system 13, it is possible to use spherical lenses which can transform laser beam intensity distribution curves into bell-profiled ones.

EXAMPLES

Overlapped steel plates were laser welded using the solid-state laser processing apparatus 1 illustrated in FIG. 1.

In the following examples, the beam quality of a laser beam emitted from the solid-state laser oscillator 3 was controlled to $M^2=105$, and an optical fiber whose core diameter was 0.6 mm was used as the optical fiber 11. Moreover, the following two types of the transfer optical system 13 built into the processing head 12 were prepared:

Example No. 1 comprising coupled two plane-convex lenses whose diameter was 50 mm and focal distance was 100 mm, whose spherical sides faced to each other, and which were disposed at an interval of 110 mm; and Example No. 2 comprising coupled two plane-convex lenses whose diameter was 50 mm and focal distance was 120 mm, whose spherical sides faced to each other, and which were disposed at an interval of 70 mm.

As for the steel plates, two automotive steel plates whose thickness was 0.7 mm were used. The steel plates were overlapped one above the other. The top surface of the upper steel plate was irradiated by the laser beam.

The laser welding was carried out under the conditions that the welding speed was controlled at 4 m/min., and that an argon gas was blown to the overlapped steel plates, the workpiece, at a rate of 15 L/min. to shield the workpiece.

Figure 6:
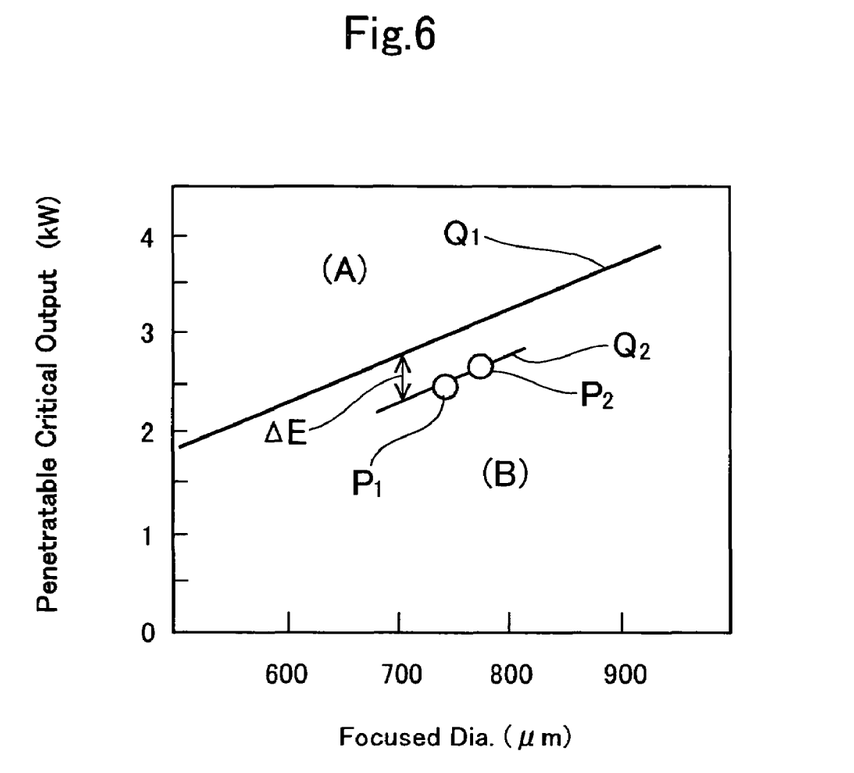
FIG. 6 is a graph for illustrating a range of weldable conditions when laser welding overlapped steel plates.
Figure 7:
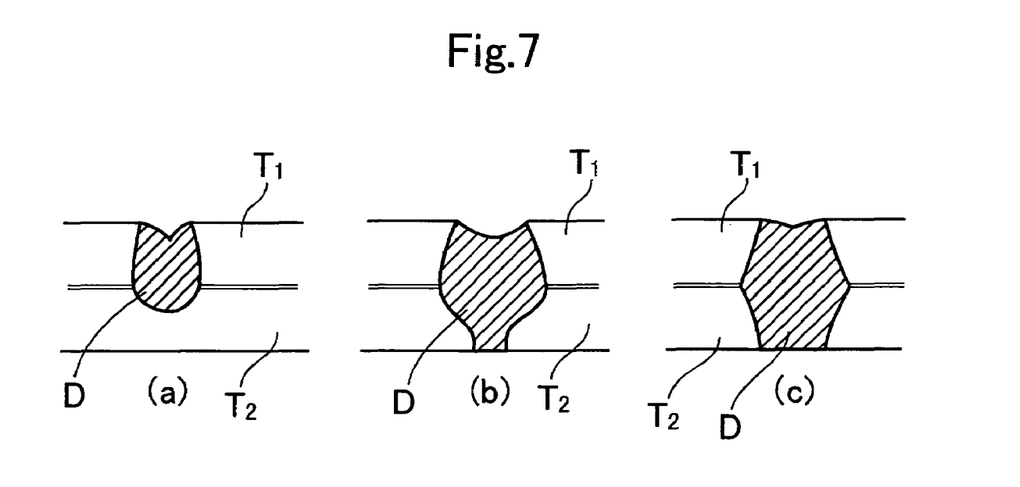
FIG. 7 is a diagram for illustrating how the formation of beads depends on laser output changes when laser welding overlapped steel plates.

Under the above-described conditions, the overlapped steel plates were welded using laser beams which exhibited bell-profiled intensity distribution curves according to the present invention. In welding the overlapped steel plates, the variations of the critical output for weld bead to penetrate through bottom with respect to the focused diameter of laser beam were examined. The resulting variations were compared with that demonstrated in welding overlapped steel plates using a laser beam which exhibited a conventional top hat-profiled intensity distribution curve according to a comparative example, thereby evaluating the advantages effected by Example Nos. 1 and 2. FIG. 6 illustrates the evaluation results. Here, the critical output for weld bead to penetrate through bottom means a critical laser beam output which a weld bead D requires to penetrate through the bottom surface of a bottom plate $T_2$ as designated at (b) of FIG. 7 when the top surface of the upper plate $T_1$ is irradiated by a laser beam. Note that a weld defect is designated at (a) of FIG. 7 by which no sufficient weld strength is produced, because a weld bead D reaches down to a midway point only in the thickness-wise direction of the bottom plate $T_2$. On the other hand, a preferable weld state is designated at (c) of FIG. 7 by which a sufficient weld strength can be produced, because a weld bead D fully reaches the bottom surface of the bottom plate $T_2$ by applying an energy of the critical output for weld bead to penetrate through bottom or more.

In FIG. 6, the line designated at $Q_1$ (hereinafter referred to as a "penetratable critical line") is the variation of the critical output for weld bead to penetrate through bottom with respect to the focused diameter of laser beam, variation which was obtained in welding overlapped steel plates using a laser beam which exhibited a conventional top hat-profiled intensity distribution curve. Note that the beam quality of the laser beam was controlled to $M^2=75$. Moreover, the intensity distribution curve of the laser beam at the focal point was turned into a top hat-shaped profile with the transfer optical system 13, and the focused diameter of the laser beam was varied by changing the transfer magnification, thereby plotting the critical outputs for weld bead to penetrate through bottom against the focused diameters to prepare the penetratable critical line $Q_1$. Note that the other welding conditions, such as the thickness of the steel plates, were the same as those in Example Nos. 1 and 2.

From FIG. 6, the following can be appreciated. When using laser beams which exhibit top hat-profiled intensity distribution curves, the region (A) above the penetratable critical line $Q_1$ specifies conditional ranges in which good overlapped welds can be produced. On the other hand, the region (B) below the penetratable critical line $Q_1$ specifies conditional ranges in which no good overlapped welds can be produced.

In FIG. 6, a first blank circle (○) designated at $P_1$ specifies the result produced by Example No. 1 using the plane-convex lenses 14, 14 whose focal distance was 100 mm. Moreover, a second blank circle (○) designated at $P_2$ specifies the result produced by Example No. 2 using the plane-convex lenses 14, 14 whose focal distance was 120 mm. The line $Q_2$ obtained by connecting $P_1$ and $P_2$ is a penetratable critical line when using laser beams whose beam quality was controlled to $M^2=105$ and which exhibited bell-profiled intensity distribution curves.

When comparing the penetratable critical line $Q_1$ with the penetrable critical line $Q_2$, it is appreciated from FIG. 6 that the penetratable critical output can be lowered by $\Delta E$ if laser beams have an identical focused diameter.

Thus, the present laser welding process can reduce an input heat quantity required per focused diameter in welding overlapped steel plates. Accordingly, it is possible to expand weldable conditional ranges which can produce good overlapped welds. Specifically, when welding overlapped steel plates using low beam-quality laser beams which exhibit bell-profiled intensity distribution curves involving the spherical aberration of lenses (i.e., which exhibit low beam qualities), an input thermal energy required per focused diameter is less than when welding overlapped steel plates using high beam-quality laser beams which exhibit top hat-profiled intensity distribution curves (i.e., which exhibit high beam qualities). However, the former (i.e., the present laser welding process) can produce overlapped welds whose weld strength is equivalent to those produced by the latter (i.e., the conventional laser welding process).

INDUSTRIAL APPLICABILITY

The focused diameter of laser beams used actually when laser welding overlapped automotive steel plates is about 0.6 mm, and the core diameter of optical fibers used therein is 0.6 mm in general. Therefore, the beam quality of incident laser beams can be satisfied when it is $M^2<120$, the critical incident beam angle to optical fibers. However, commonly used solid-state laser processing apparatuses emit overquality laser beams whose beam qualities are about $M^2<75$. As a result, the manufacturing cost of such solid-state laser processing apparatus has gone up.

On the other hand, the present invention makes it possible to fully carry out desirable welding even with such low beam-quality laser beams whose beam qualities fall in a range of $85 \leq M^2 \leq 105$. Accordingly, when high-output rod-shaped solid-state laser media are used, not only it is possible to drastically reduce the manufacturing cost of solid-state laser processing apparatuses, but also it is possible to sharply downsize solid-state laser oscillators.

Moreover, in the present solid-state laser processing apparatus, the transfer optical system built into the processing head can be adapted to the simplified construction which uses extremely ordinary spherical lenses. Consequently, the transfer optical system with such a simplified construction is available at lower cost as well as it is highly reliable in manufacturing lines. In addition, such a transfer optical system can be readily assembled with robots.

The present laser welding process can turn the intensity distribution curves exhibited by laser beams into bell-profiled intensity distribution curves. Accordingly, it is possible to enhance the permissibility for the fluctuation of spaces between overlapped steel plates in laser welding. Consequently, the defects, such as fused-off steel plates, can be made so less that it is possible to upgrade weld qualities.

As described above, the present solid-state laser processing apparatus, and the present laser welding process using the same are greatly beneficial to reducing equipment cost and upgrading productivity in laser welding.

Having now fully described the present invention, it will be apparent to one of ordinary skill in the art that many changes and modifications can be made thereto without departing from the spirit or scope of the present invention as set forth herein including the appended claims.

What is claimed is:
1. A laser welding process, comprising:
welding overlapped steel plates with a solid state laser processing apparatus, said apparatus comprising:
a solid-state laser oscillator for oscillating a laser beam, said oscillator comprising an exciter, a partial reflection mirror, first and second lenses, and an aperture having a controlled diameter for controlling a beam diameter of the laser beam;
an optical fiber for guiding the controlled laser beam; and a processing head comprising a transfer optical system for focusing the guided laser beam, and for irradiating the guided laser beam to a surface of a workpiece to be processed;

the laser welding process comprising:

controlling the beam diameter by controlling the controlled diameter of the aperture such that a beam quality $M^2$ of the laser falls in a range of $85 \leqq M^2 \leqq 105$, wherein the laser beam has a first incidence angle $\theta_1$ prior to entering the optical fiber, and a second incidence angle $\theta_2$ after exiting the optical fiber, wherein $\theta_1 = \tan^{-1}(A/2L) = A/2L$, and $\theta_1 \approx \theta_2$, wherein the beam quality $M^2$ is defined as $M^2 = \pi \times D \times (\theta_2/1.5)/(2 \times \lambda)$, with D being the diameter of the optical fiber, wherein $\lambda$ is a wavelength of the laser beam, wherein A is a diameter of the aperture, wherein L is a distance from the aperture to the optical fiber, wherein the transfer optical system comprises two spherical lenses, and wherein the two spherical lenses are plane-convex lenses.

2. The laser welding process set forth in claim 1, wherein the solid-state laser processing apparatus further comprises a laser medium composed of Nd:YAG.

3. The laser welding process set forth in claim 1, wherein the first lens is a relay lens.

4. The laser welding process set forth in claim 1, wherein the second lens is a condensing lens.

\* \* \* \* \*

UNITED STATES PATENT AND TRADEMARK OFFICE
CERTIFICATE OF CORRECTION

PATENT NO. : 7,608,799 B2 Page 1 of 1
APPLICATION NO. : 11/001052
DATED : October 27, 2009
INVENTOR(S) : Mikata et al.

It is certified that error appears in the above-identified patent and that said Letters Patent is hereby corrected as shown below:

Column 9, lines 11-12, "$\theta_1 = \tan^{-1} (A/2L) = A/2L$," should read --$\theta_1 = \tan^{-1} (A/2L) \approx A/2L$,--.

Signed and Sealed this

Fifth Day of January, 2010

David J. Kappos
*Director of the United States Patent and Trademark Office*